(12) United States Patent
Shiomura et al.

(10) Patent No.: US 11,592,937 B1
(45) Date of Patent: Feb. 28, 2023

(54) SYSTEM AND METHOD FOR TOUCH SENSING NOISE MITIGATION USING SUB-BURST SIZE

(71) Applicant: Synaptics Incorporated, San Jose, CA (US)

(72) Inventors: Masaaki Shiomura, Tokyo (JP); Nobukazu Tanaka, Tokyo (JP); Daisuke Ito, Tokyo (JP); Sung-Sool Lee, Gangnam-gu (KR)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/689,720

(22) Filed: Mar. 8, 2022

(51) Int. Cl.
*G06F 3/041* (2006.01)
*G06F 3/044* (2006.01)

(52) U.S. Cl.
CPC ........ *G06F 3/04182* (2019.05); *G06F 3/0412* (2013.01); *G06F 3/0443* (2019.05); *G06F 3/041662* (2019.05)

(58) Field of Classification Search
CPC ........... H01L 27/323; G06F 3/041–047; G06F 2203/041–04114; G06F 3/0418; G06F 3/04182; G06F 3/04184; G06F 2203/04101
See application file for complete search history.

(56) References Cited

U.S. PATENT DOCUMENTS

| | | | | |
|---|---|---|---|---|
| 2016/0077617 A1* | 3/2016 | Lee | ..................... | G06F 3/04184 345/173 |
| 2022/0121298 A1* | 4/2022 | Ding | ..................... | H03G 3/344 |

\* cited by examiner

*Primary Examiner* — Sanjiv D. Patel
(74) *Attorney, Agent, or Firm* — Ferguson Braswell Fraser Kubasta PC

(57) ABSTRACT

A display controller includes a touch sensing controller configured to drive sensing electrodes with a touch sensing waveform that includes multiple modulations. The touch sensing controller is further configured to halt driving the plurality of sensing electrodes when a number of the modulations satisfies a selected sub-burst size. The touch sensing waveform is synchronized to an instance of a horizontal sync signal.

20 Claims, 5 Drawing Sheets

SYSTEM AND METHOD FOR TOUCH SENSING NOISE MITIGATION USING SUB-BURST SIZE

TECHNICAL FIELD

The described embodiments relate generally to electronic devices, and more specifically, to a technique for mitigating touch-to-display noise in a display system having a touch sensor screen.

BACKGROUND

Input devices including proximity sensor devices (e.g., touchpads or touch sensor devices) are widely used in a variety of electronic systems. Proximity sensor devices are often combined with display devices to operate as input-display devices (such as touch screens integrated in cellular phones). In such an input-display device, the proximity sensor device and the display device may be highly integrated. The high integration may result in parasitic capacitances between components of the proximity sensor device and components of the display device. As a result, a sensing waveform, emitted by the proximity sensor device, may capacitively couple onto signals of the display device, thereby causing display artifacts.

Some displays, such as OLED displays, have significant coupling between the touch sensor and the display, such that the touch sensor stimulation voltages can couple into the display pixels and disrupt the intended brightness for a given display line. These artifacts have been termed "touch-to-display noise" that is defined as the display noise caused by touch sensing.

SUMMARY

In general, in one aspect, one or more embodiments relate to a display controller. The display controller includes a touch sensing controller configured to drive sensing electrodes with a touch sensing waveform that includes multiple modulations. The touch sensing controller is further configured to halt driving the plurality of sensing electrodes when a number of the modulations satisfies a selected sub-burst size. The touch sensing waveform is synchronized to an instance of a horizontal sync signal.

In another aspect, one or more embodiments relate to an input-display device having multiple capacitive sensing electrodes for capacitive sensing in a sensing region of a display screen. The input-display device also includes a display controller. The display controller includes a touch sensing controller configured to drive sensing electrodes with a touch sensing waveform that include multiple modulations. The touch sensing waveform is synchronized to an instance of a horizontal sync signal. A number of the modulations is determined by a selected sub-burst size.

In still another aspect, one or more embodiments relate to a method for driving a display of an input-display device. The method includes driving sensing electrodes with a touch sensing waveform having multiple modulations. The first touch sensing waveform is synchronized to a first instance of a horizontal sync signal. The number of modulations is determined by a first selected sub-burst size. The method also includes driving the sensing electrodes with the first touch sensing waveform when a second instance of the horizontal sync signal occurs and detecting ambient noise. In response to detecting the ambient noise, the method includes driving the sensing electrodes with a second touch sensing waveform that includes second multiple modulations. The second touch sensing waveform is synchronized to an instance of the horizontal sync signal. The number of the second multiple modulations is determined by a second selected sub-burst size.

DETAILED DESCRIPTION

The following detailed description is merely exemplary in nature and is not intended to limit the disclosed technology or the application and uses of the disclosed technology. Furthermore, there is no intention to be bound by any expressed or implied theory presented in the preceding technical field, background, or the following detailed description.

The present disclosure describes a system and a related method for avoiding the display artifacts caused by touch-to-display noise using touch controllers. Touch-to-display noise is display noise that is caused by touch sensing. The disclosed system mitigates touch-to-display noise on input-display devices using touch sensing signals that are synchronized with the horizontal synchronization (Hsync) signal and that use selected sub-burst sizes. The Hsync signal is a pulse that synchronizes the start of the horizontal picture scan lie in a display with the image source that created the image. According to the disclosed technique, the touch sensing signals that drive the touch screen sensors are modulated after an Hsync signal. The disclosed technique limits the number of modulations after an Hsync signal according to the selected sub-burst size. The touch sensing signal stops until the next Hsync signal. In an embodiment, the number of sub-bursts is configurable by a firmware setting. By limiting the number of modulations that occur after an Hsync signal, the effective frequency of the touch sensing signal may be shifted away from the Hsync signal, thereby preventing interference with ambient noise, such as the noise produced by a charger.

Figure 1:
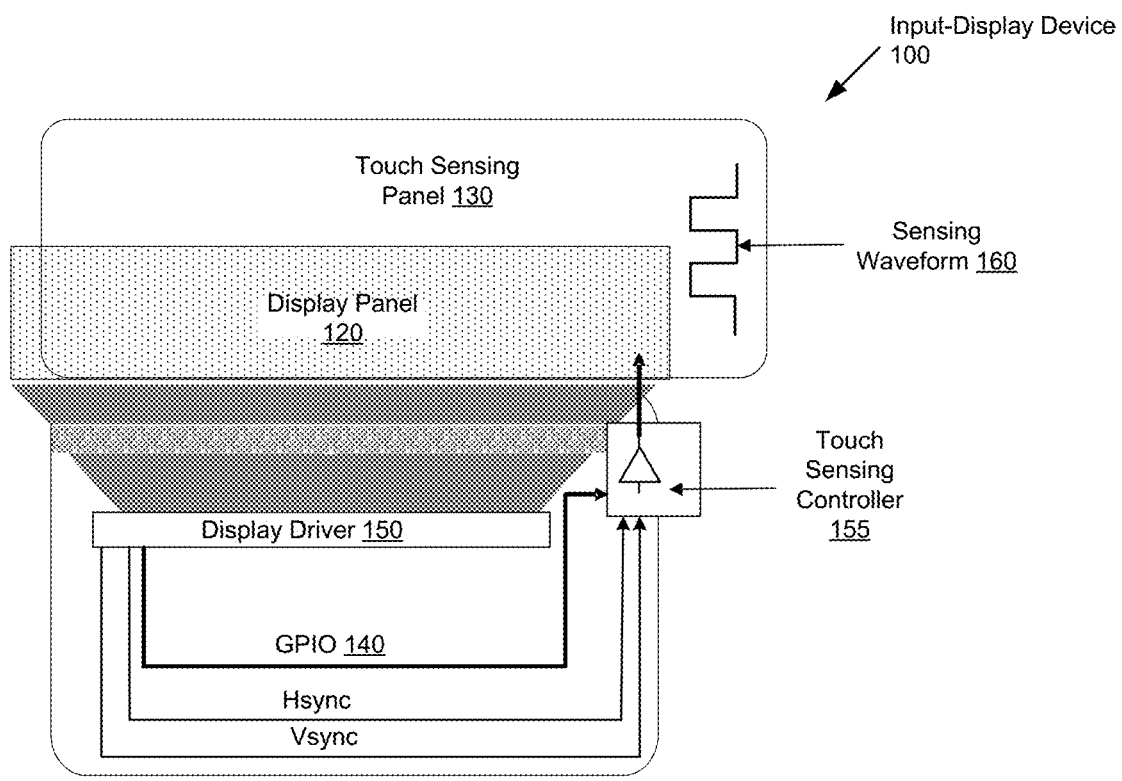
FIG. 1 shows an input display device in accordance with one or more embodiments.

FIG. 1 shows an input display device (100) in accordance with one or more embodiments. In general, an input display device is device that includes a display region and a touch sensing region that overlaps with the display region. An example of an input display device is a touchscreen. The input-display device (100) comprises a display panel (120), driven by a display driver (150), and a touch panel (130), driven by a touch sensing controller (155).

The touch sensing controller (155) performs touch sensing using a sensing waveform (160). In one or more embodiments, data about the sensing waveform (160) is shared with the display driver (150). In some embodiments of the input-display device (100), the sensing waveform (160) itself may be provided to the display driver (150). Accordingly, the display driver (150) is aware of the timing, polarity, and amplitude of the sensing waveform (160) by receiving the sensing waveform (160). In some embodiments, the timing and polarity information may be provided by a pulse train transmitted using one or more general purpose input/output (GPIO) pin(s) 140. The display driver (150) also provides a horizontal sync (Hsync) signal and a vertical sync (Vsync) signal to the touch sensing controller (155).

The touch panel (130) defines a sensing region, often demarked by a surface of the touch panel (130). In the sensing region, the touch panel (130) determines the presence, location, motion, and/or force of one or more input objects. As used herein, touch sensing includes proximity (e.g., no contact), touch (e.g., contact on an input surface), and contact with force. Thus, the sensing region includes the surface of the input display device and an area around the surface of the input display device.

Touch sensing is implemented with touch sensors. The touch sensors are electrodes in the touch panel (130) that are used in performing touch sensing. Examples of touch sensing is capacitive sensing as described below.

Some capacitive implementations utilize "self capacitance" (or "absolute capacitance") sensing methods based on changes in the capacitive coupling between sensor electrodes and an input object. In various embodiments, an input object near the sensor electrodes in the touch panel (130) alters the electric field near the sensor electrodes, thus changing the measured capacitive coupling. In one implementation, an absolute capacitance sensing method operates by modulating sensor electrodes using the sensing waveform and with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitance measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter", TX) and one or more receiver sensor electrodes (also "receiver electrodes" or "receiver", RX). Transmitter sensor electrodes may be modulated using the sensing waveform relative to a reference voltage (e.g., system ground) to transmit transmitter signals. Receiver sensor electrodes may be held substantially constant relative to the reference voltage to facilitate receipt of resulting signals. The reference voltage may be a substantially constant voltage. In various embodiments, the reference voltage may be system ground.

In some embodiments, transmitter sensor electrodes and receiver sensor electrodes may both be modulated. In an embodiment, the modulation signals may be non-sinusoidal signals having a specified sub-burst size. For example, the transmitter sensor electrodes may be modulated by a sub-burst of twenty (20) pulses of a square wave at a specified, fixed frequency. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers or may be configured to both transmit and receive. Measurements acquired using mutual capacitance sensing methods may be referred to as mutual capacitance measurements.

The absolute capacitance measurements and/or the mutual capacitance measurements may be used to determine when at least one input object is in a sensing region, determine signal-to-noise ratio (SNR), determine positional information of an input object, identify a gesture, determine an action to perform based on the gesture, a combination of gestures or other information, and/or perform other operations.

The display panel (120) may be used to display content or information to a user, and the touch sensing may enable the user to interact with the displayed content. The touch sensing may involve driving the touch sensors with a sensing waveform, e.g., a square wave. The presence of the sensing waveform on the touch sensors may cause interference in the screen of the display panel (120). The interference may result in display artifacts, such as darker and/or lighter regions in the display screen, e.g., in a striped pattern. In one or more embodiments, the driving of the touch panel (130) is performed in a manner compensating for the interference, such that the artifacts are reduced or avoided.

In some embodiments, the sensing region overlaps at least part of an active area of the display panel (120). For example, the input-display device (100) may include substantially transparent sensor electrodes overlaying the display panel (120) and provide a touch screen interface. The display panel (120) may be any type of dynamic display capable of displaying a visual interface to a user and may include any type of light emitting diode (LED), organic LED (OLED), microLED, liquid crystal display (LCD), or other display technology. The proximity and/or force sensor device and the display panel of the input-display device (100) may share physical elements.

While FIG. 1 shows a configuration of components, other configurations may be used without departing from the scope of the invention. For example, various components may be combined to create a single component. As another example, the functionality performed by a single component may be performed by two or more components.

Figure 2:
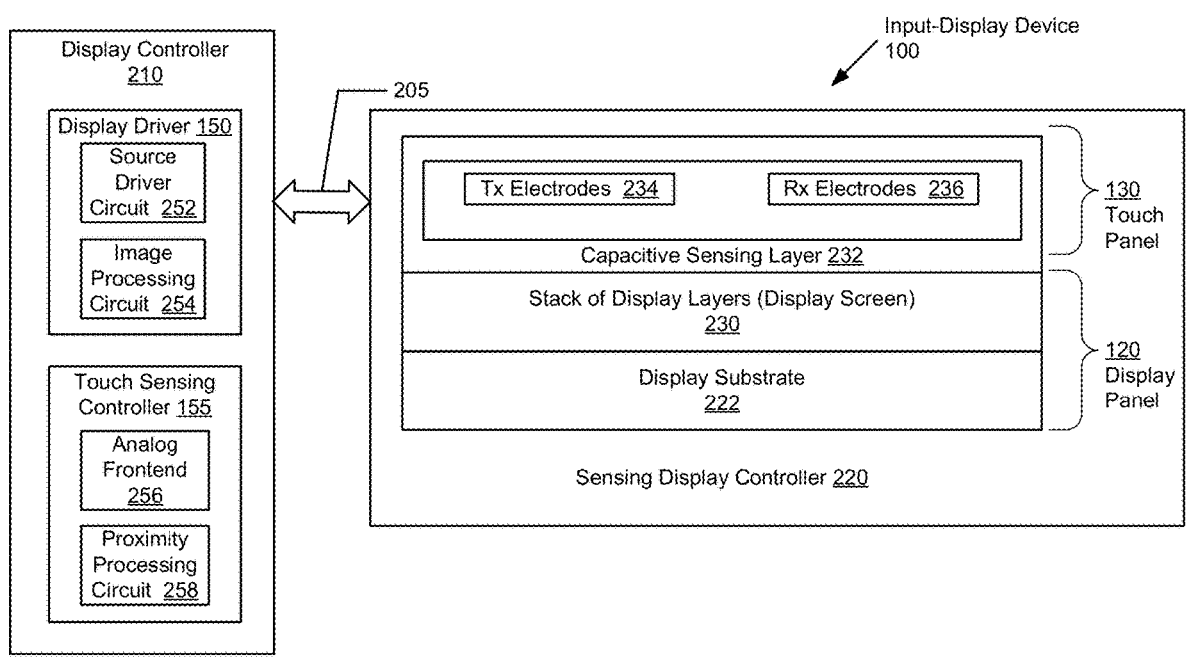
FIG. 2 shows an input display device in accordance with one or more embodiments.

FIG. 2 shows an input-display device (100) in accordance with one or more embodiments. As shown in FIG. 2, input-display device (100) comprises a display controller (210) and a sensing display controller (220) that are coupled via routing traces (205). The sensing display controller (220) may implement all or a part of the touch panel (130) and all or a part of the display panel (120), discussed above in reference to FIG. 1.

In a first embodiment, the display controller (210) includes a discreet display driver (150) and a discreet touch sensing controller (155). In a second embodiment, the display controller (210) may include a touch and display driver integrated (TDDI) circuit that incorporates all of the functionality of the display driver (150) and the touch sensing controller (155) in a single device. In one or more embodiments, the sensing display controller (220) includes multiple layers, including a stack of display layers (230), one or more capacitive sensing layers (232), and a display substrate (222). The display layers (230) form a display screen. In one embodiment, the display screen is an OLED display. Accordingly, the stack of display layers (230) may include OLED display layers such as an organic emissive layer, an anode layer, a cathode layer, one or more conductive layers which may include a thin-film transistor (TFT) layer, etc. The stack of display layers (230) may be disposed on the display substrate (222). In one embodiment, the display substrate (222) is a flexible plastic substrate, to enable a flexible, rollable and/or foldable OLED display.

The stack of display layers (230) may include microLED layers such as a layer of LEDs disposed on a thin-film transistor (TFT) layer on the display substrate (222). The stack of display layers (230) may include LCD display layers such as a color filter glass layer, a liquid crystal layer, and a TFT layer disposed on the display substrate (222), which may be glass.

The sensing-display controller (220) may have additional layers and components. In one or more embodiments, multiple transmitter (TX) electrodes (234) and/or receiver (RX) electrodes (236) are disposed in the one or more capacitive sensing layers (232) in a sensing region of the display screen. The sensing region may span all or part of the display screen. The TX electrodes (234) and/or RX electrodes (236) may be used in capacitance sensing (e.g., absolute capacitance sensing, mutual capacitance sensing, etc.), as described above in reference to FIG. 1.

While FIG. 2 shows the capacitive sensing layer(s) (232) as being disposed on top of the stack of display layers (230), these layers may be located anywhere, relative to the stack of display layers (230). For example, one layer with RX electrodes (236) may be located on top of the stack of display layers (230), and another layer with TX electrodes (234) may be located in or below the stack of display layers (230). Alternatively, there may be no layer with TX electrodes. In one or more embodiments, the sensing display controller (220) includes a matrix pad sensor with numerous sensing pads and traces connecting to the sensing pads in a metal mesh layer across the sensing region. The matrix pad sensor may include at least one such metal mesh layer. Instead of using a dedicated metal mesh layer, a display layer (e.g., an OLED display cathode layer) may be patterned to serve as a metal mesh layer.

In one or more embodiments, the TX electrodes (234) and the RX electrodes (236), together, implement mutual capacitance sensing. In other words, a sensing waveform is driven onto the TX electrodes (234) and a resulting signal(s) is received from the RX electrodes (236). The resulting signal is a function of the sensing waveform and a change in capacitance between the TX electrodes (234) and RX electrodes (236) due to the presence of an input object. In one or more embodiments, the RX electrodes (236) are operated to perform absolute capacitance sensing independent of the TX electrodes (234). In one or more embodiments, the transmitter electrodes (234) are operated to perform absolute capacitance sensing independent of the receiver electrodes (236).

In one or more embodiments, the stack of display layers (230) includes one or more layers (e.g., a thin-film transistor (TFT) layer) with source lines and gate lines and transistors for controlling the individual OLED, LCD or microLED units of the display pixels (or pixels) of the display screen. In one or more embodiments, one or more source lines and/or one or more gate lines are also operated to perform absolute capacitance sensing.

In one or more embodiments, the display driver (150) includes a source driver circuit (252) that drives the transistors controlling the pixels of the display screen. Each of the pixels may include an OLED pixel, a microLED pixel, a microOLED pixel, an LCD pixel, etc. The display driver (150) may receive an image signal from a host application processor (e.g., a video processor), or any other component (not shown) that provides image content to be displayed on the display screen of the display panel (120). The received image signal may be in digital form. According to an embodiment, the display driver (150) generates a vertical synchronization (Vsync) signal and a horizontal synchronization (Hsync) signal for the image signal. In an embodiment, the Hsync signal is a pulse that synchronizes the start of the horizontal picture scan line and the Vsync signal is a pulse that synchronizes the start of an image at the top of the display screen. As shown in FIG. 1, the display driver (150) provides the Hsync signal and the Vsync signal to the touch sensing controller (155).

The display driver (150) may further include an image processing circuit (254) that may process the received image signal to output a processed image signal. For example, the image processing circuit (254) may perform a mura correction and/or other image processing operations. The processed image signal may be provided to the source driver circuit (252) where an analog signal is generated to drive the transistors associated with the pixels of the display screen, in accordance with one or more embodiments. The image processing circuit (254) may be integrated in the display driver (150) or the image processing circuit (254) may be located elsewhere. Any kind of additional circuits related to the displaying of images may be included in the display driver (150), without departing from the disclosure.

In one or more embodiments, the touch sensing controller (155) is configured to perform capacitance sensing. The touch sensing controller (155) may drive capacitive sensing electrodes (e.g., the TX electrodes (234) or a subset of the TX electrodes (234)) and may receive resulting signals from capacitive sensing electrodes (e.g., from the RX electrodes (236) or a subset of the RX electrodes (236)), to determine the presence and/or position of an input object. The touch sensing controller (155) may include various components. In one embodiment, the touch sensing controller (155) includes an analog frontend (256) configured to perform the capacitance sensing by driving the capacitive sensing electrodes, receiving the resulting signals, and analog-to-digital converting the resulting signals. The digital processing may be performed elsewhere, by a touch processing circuit (258), e.g., a microprocessor, digital signal processor, etc. In one embodiment, the touch sensing controller (155) includes some or all elements of the touch processing circuit (258). Alternatively, the touch processing circuit (258) may be located elsewhere.

Figure 3:
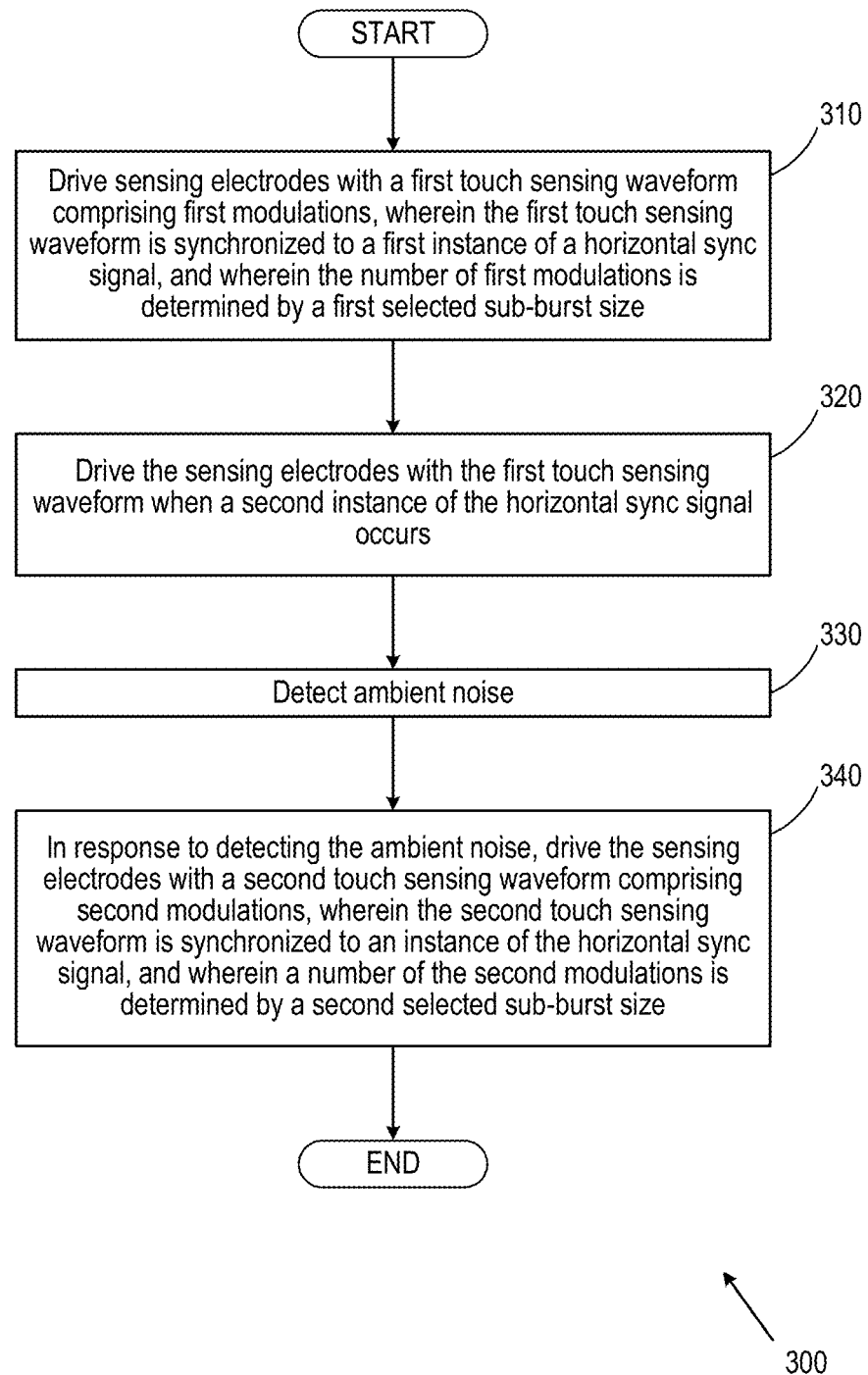
FIG. 3 shows a flow diagram illustrating the operation of an input display device in accordance with one or more embodiments.

FIG. 3 is a flow diagram illustrating the operation of an input display device in accordance with one or more embodiments. In block 310, the touch sensing controller (155) drives the sensing electrodes with a first touch sensing waveform (160) comprising a first group of modulations. The first touch sensing waveform (160) is synchronized to a first instance of a horizontal sync signal. The number of modulations in the first group of modulations is determined by a first selected sub-burst size. In block 320, the touch sensing controller (155) drives the sensing electrodes with the first touch sensing waveform (160) when a second instance of the horizontal sync signal occurs.

In block 330, the touch sensing controller (155) may detect ambient noise, such as from a charger or another electronic apparatus. In block 350, in response to detecting the ambient noise, the touch sensing controller (155) may drive the sensing electrodes with a second touch sensing waveform (160) comprising a second group of modulations.

The second touch sensing waveform (160) is synchronized to an instance of the horizontal sync signal. The number of the modulations in the second group of modulations is determined by a second selected sub-burst size. A sub-burst size is a number of modulations in a sub-burst. A sub-burst is a group of modulations that are sequentially performed without waiting for an Hsync signal to trigger a next modulation in the group. The second selected sub-burst size is a sub-burst size selected to mitigate for ambient noise and is configurable. In some embodiments, the input display device may iterate through different sub-burst sizes until a sub-burst size is selected that is detected as best mitigating for ambient noise.

Figure 4:
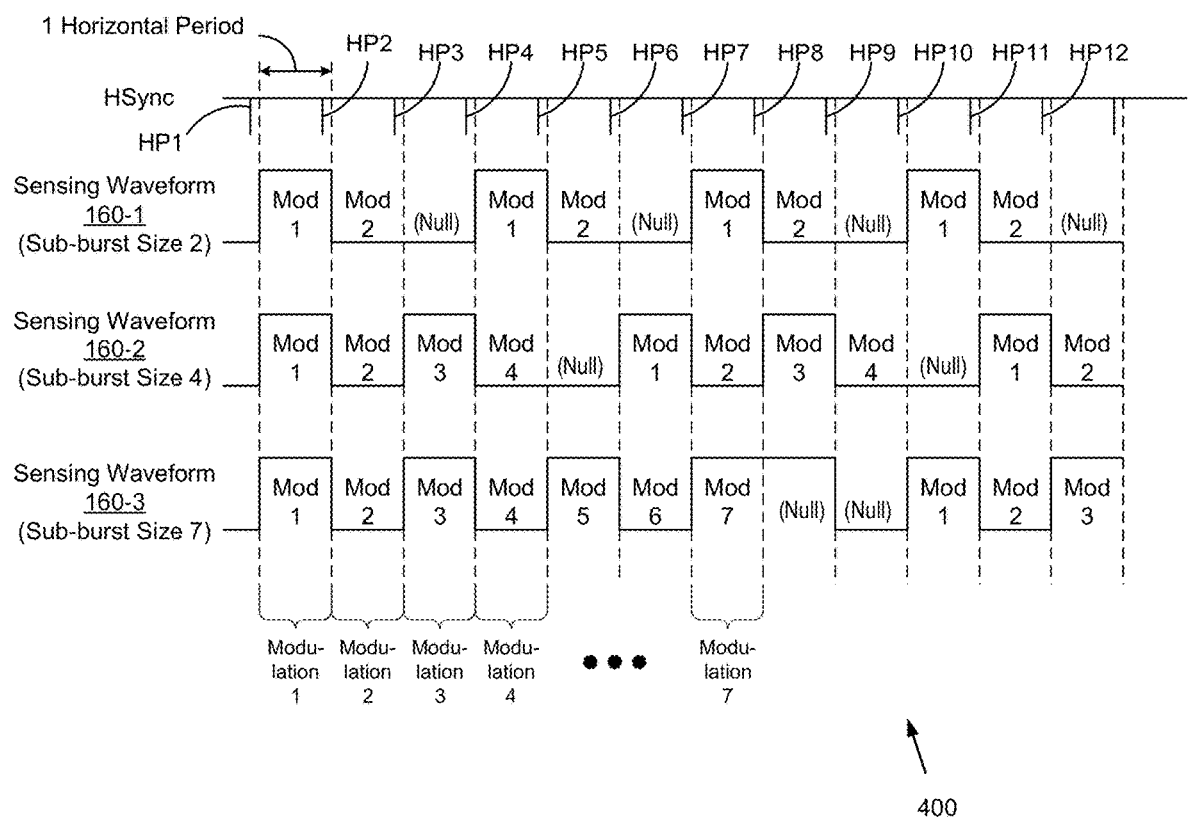
FIG. 4 shows a timing diagram illustrating the sensing waveform for various sub-burst sizes according to one or more embodiments.

FIG. 4 is a timing diagram (400) illustrating the sensing waveform (160) for various sub-burst sizes according to one or more embodiments. The horizonal synchronization (Hsync) signal is a series of negative-going pulses that may be used to trigger the sensing waveform (160). In FIG. 4, negative-going pulses include twelve (12) exemplary horizontal sync pulses labeled HP1-HP12. FIG. 4 includes three (3) exemplary sensing waveforms (160), each having a different, configurable sub-burst size. A first sensing waveform (160-1) has a sub-burst size 2. A second sensing waveform (160-2) has a sub-burst size 4. A third sensing waveform (160-3) has a sub-burst size 7. The vertical dotted lines indicate the start point and the end point of each modulation period of the sensing waveforms (160). It is noted that each vertical dotted line is delayed with respect to one of the negative-going horizontal sync pulses (i.e., HP1-HP12) in the Hsync signal.

For example, the first sensing waveform (160-1) (sub-burst size 2) has a first modulation period (Mod 1) that occurs between the first (or leftmost) vertical dotted line and the second vertical dotted line. The first sensing waveform (160-1) has a second modulation period (Mod 2) that occurs between the second vertical dotted line and the third vertical dotted line. After the Mod 1 and Mod 2 periods, the first sensing waveform 160-1 has reached the sub-burst size 2. At this point, the first sensing waveform (160-1) does not modulate until after the next Hsync signal (i.e., HP4). Therefore, no modulations occur between the vertical dotted line after HP3 and the vertical dotted after HP4. This region is labeled "Null" in FIG. 4. Thereafter, the pattern of the Mod 1, Mod 2, and Null periods repeats in the first sensing waveform (160-1).

Similarly, the second sensing waveform (160-2) (sub-burst size 4) has a second modulation period (Mod 1) that occurs between the first (or leftmost) vertical dotted line and the second vertical dotted line. The second sensing waveform (160-2) has a second modulation period (Mod 2) that occurs between the second vertical dotted line and the third vertical dotted line. The second sensing waveform (160-2) has a third modulation period (Mod 3) that occurs between the third vertical dotted line and the fourth vertical dotted line. Finally, the second sensing waveform (160-2) has a fourth modulation period (Mod 4) that occurs between the fourth vertical dotted line and the fifth vertical dotted line. After the Mod 1-Mod 4 periods, the second sensing waveform 160-2 (sub-burst size 4) has reached the sub-burst size 4. At this point, the second sensing waveform (160-2) does not modulate until after the next Hsync signal (i.e., HP6). Therefore, no modulations occur between the vertical dotted line after HP5 and the vertical dotted after HP6. This region is also labeled "Null" in FIG. 4. Thereafter, the pattern of the Mod 1, Mod 2, Mod 3, Mod 4, and Null periods repeats in the second sensing waveform (160-2).

The third sensing waveform (160-3) (sub-burst size 7) is similar in operation to the first sensing waveform (160-1) and the second sensing waveform (160-2). The third sensing waveform (160-3) has a repeating pattern that includes seven (7) modulation periods (Mod 1-Mod 7). After the Mod 1-Mod 7 periods, the third sensing waveform 160-2 has reached the sub-burst size 7 and does not modulate during the "Null" periods. The pattern then repeats after HP10 in the third sensing waveform (160-3).

In the examples above, the three sensing waveforms (160-1, 160-2, 160-3) are synchronized to the Hsync signal but the modulations of the sensing waveforms (160) have a different effective frequency than the Hsync signals due to the presence of the "Null" periods in which modulation does not occur. Thus, if ambient noise is present at the Hsync frequency (e.g., charger noise), the frequency of the sensing waveform (160) can be shifted away from the ambient noise frequency by changing the configurable sub-burst size.

Figure 5:
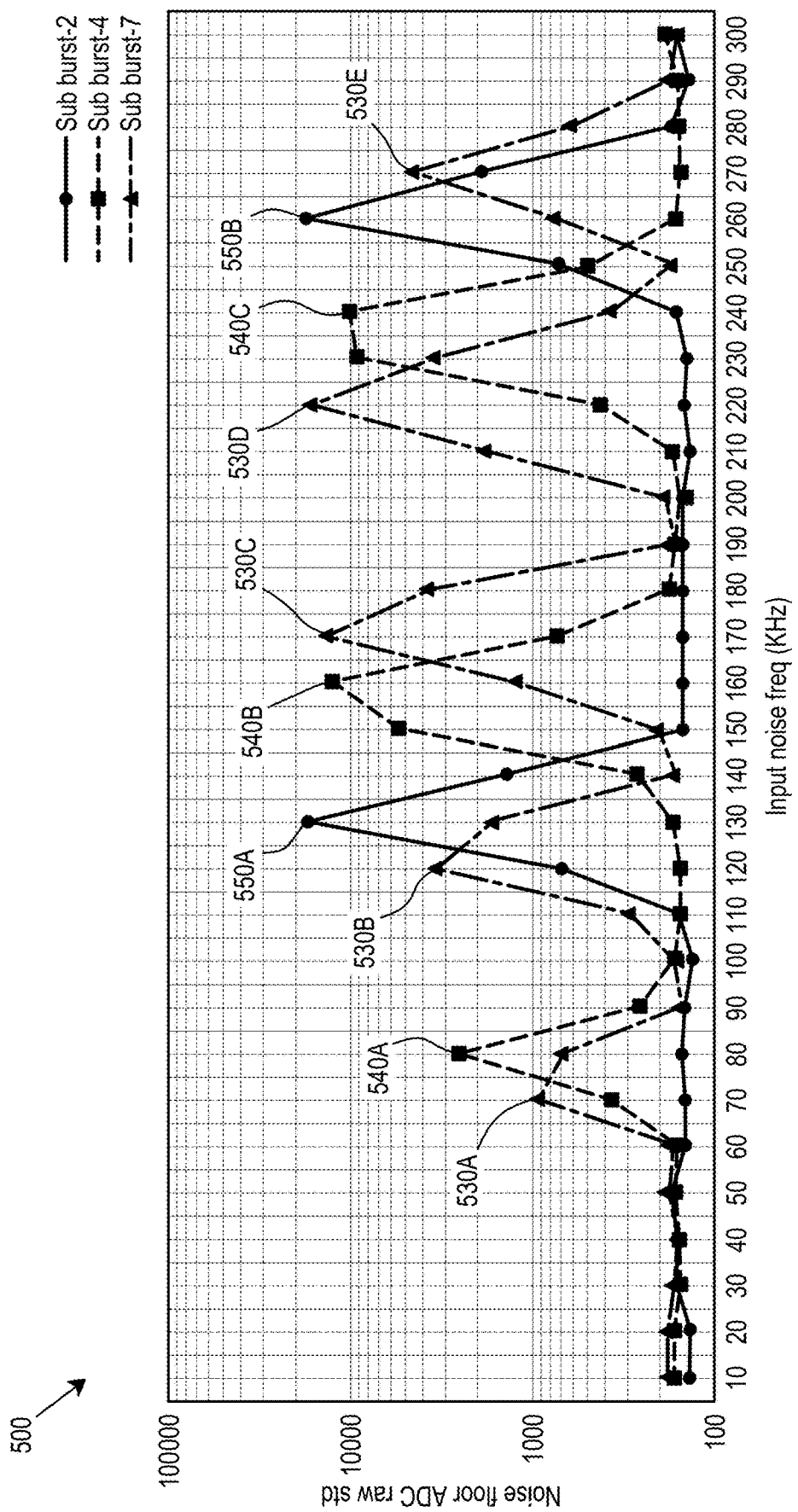
FIG. 5 shows a frequency spectrum for various sub-burst sizes according to one or more embodiments.

FIG. 5 is a frequency spectrum 500 for various sub-burst sizes according to one or more embodiments. In FIG. 5, an input noise frequency noise from 10 KHz to 300 KHz is shown on the horizontal axis.

The frequency spectrum for a first sensing waveform (160-1) (sub-burst size 2) has a first peak 550A at approximately 130 KHz and a second peak 550B at approximately 260 KHz.

The frequency spectrum for a second sensing waveform (160-2) (sub-burst size 4) has a first peak 540A at approximately 80 KHz, a second peak 540B at approximately 160 KHz, and a third peak 540C at approximately 240 KHz.

The frequency spectrum for a third sensing waveform (160-3) (sub-burst size 7) has a first peak 530A at approximately 70 KHz, a second peak 530B at approximately 120 KHz, a third peak 530C at approximately 170 KHz, a fourth peak 530D at approximately 220 KHz, and a fifth peak 530E at approximately 270 KHz.

Thus, if the Hsync signal and the ambient noise have a frequency of 160 KHz, this may interfere with the second sensing waveform (160-2) (sub-burst size 4) having a peak 540B at 160 KHz. This interference may be mitigated by changing the sub-burst size from 4 to 2. The first sensing waveform (160-1) (sub-burst size 2) has a peak 550A at 130 KHz, which will not produce interference at 160 KHz.

In the above detailed description of embodiments, numerous specific details are set forth to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

What is claimed is:

1. A display controller, the display controller comprising:
a touch sensing controller configured to:
drive a plurality of sensing electrodes with a first touch sensing waveform comprising a first plurality of modulations, and
halt driving the plurality of sensing electrodes when a number of the first plurality of modulations is determined by a first selected sub-burst size,
wherein the first touch sensing waveform is synchronized to a first instance of a horizontal sync signal.

2. The display controller of claim 1, wherein the touch sensing controller is further configured to resume driving the plurality of sensing electrodes with the first touch sensing waveform when a second instance of the horizontal sync signal occurs.

3. The display controller of claim 1, wherein the touch sensing controller is further configured to drive the plurality of sensing electrodes with a second touch sensing waveform comprising a second plurality of modulations, wherein the second touch sensing waveform is synchronized to a second instance of the horizontal sync signal, and wherein a number of the second plurality of modulations is determined by a second selected sub-burst size.

4. The display controller of claim 3, wherein the display controller is configured to detect an ambient noise.

5. The display controller of claim 4, wherein the touch sensing controller is configured to switch from the first touch sensing waveform to the second touch sensing waveform in response to ambient noise having a frequency substantially equal to a frequency of the horizontal sync signal.

6. The display controller of claim 4, wherein the first plurality of modulations and the second plurality of modulations have a fixed frequency.

7. The display controller of claim 6, wherein each of the first plurality of modulations and the second plurality of modulations comprises a non-sinusoidal waveform.

8. The display controller of claim 1, wherein the first selected sub-burst size determines an effective frequency of the first touch sensing waveform by limiting the number of the first plurality of modulations generated by the touch sensing controller.

9. An input-display device, comprising:
a plurality of capacitive sensing electrodes for capacitive sensing in a sensing region of a display screen; and
a display controller, the display controller comprising:
a touch sensing controller configured to drive a plurality of sensing electrodes with a first touch sensing waveform comprising a first plurality of modulations, wherein the first touch sensing waveform is synchronized to a first instance of a horizontal sync signal, and wherein a number of the first plurality of modulations is determined by a first selected sub-burst size.

10. The input-display device of claim 9, further comprising the display screen disposed on a display substrate, the display screen comprising a plurality of display pixels.

11. The input-display device of claim 9, wherein the touch sensing controller is further configured to drive the plurality of sensing electrodes with the first touch sensing waveform when a second instance of the horizontal sync signal occurs.

12. The input-display device of claim 9, wherein the touch sensing controller is further configured to drive the plurality of sensing electrodes with a second touch sensing waveform comprising a second plurality of modulations, wherein the second touch sensing waveform is synchronized to an instance of the horizontal sync signal, and wherein a number of the second plurality of modulations is determined by a second selected sub-burst size.

13. The input-display device of claim 12, wherein the display controller is configured to detect an ambient noise.

14. The input-display device of claim 13, wherein the touch sensing controller is configured to switch from the first touch sensing waveform to the second touch sensing waveform in response to ambient noise having a frequency substantially equal to a frequency of the horizontal sync signal.

15. The input-display device of claim 13, wherein the first plurality of modulations and the second plurality of modulations have a fixed frequency.

16. The input-display device of claim 15, wherein each of the first plurality of modulations and the second plurality of modulations comprises a non-sinusoidal waveform.

17. The input-display device of claim 9, wherein the first selected sub-burst size determines an effective frequency of the first touch sensing waveform by limiting the number of the first plurality of modulations generated by the touch sensing controller.

18. A method for driving a display of an input-display device, the method comprising:
driving a plurality of sensing electrodes with a first touch sensing waveform comprising a first plurality of modulations, wherein the first touch sensing waveform is synchronized to a first instance of a horizontal sync signal, and wherein a number of the first plurality of modulations is determined by a first selected sub-burst size;
driving the plurality of sensing electrodes with the first touch sensing waveform when a second instance of the horizontal sync signal occurs;
detecting ambient noise; and
in response to detecting the ambient noise, driving the plurality of sensing electrodes with a second touch sensing waveform comprising a second plurality of modulations, wherein the second touch sensing waveform is synchronized to an instance of the horizontal sync signal, and wherein a number of the second plurality of modulations is determined by a second selected sub-burst size.

19. The method of claim 18, wherein the first plurality of modulations and the second plurality of modulations have a fixed frequency.

20. The method of claim 19, wherein detecting the ambient noise further comprises switching from the first touch sensing waveform to the second touch sensing waveform in response to the ambient noise having a frequency substantially equal to a frequency of the horizontal sync signal.

* * * * *